United States Patent

[11] 3,576,060

| [72] | Inventor | William B. Stein |
| | | Barberton, Ohio |
| [21] | Appl. No. | 716,933 |
| [22] | Filed | Mar. 28, 1968 |
| [45] | Patented | Apr. 27, 1971 |
| [73] | Assignee | The Warner & Swasey Company |
| | | Cleveland, Ohio |

[54] INSERT BIT HAVING VIBRATION-DAMPENING PROPERTIES
4 Claims, 8 Drawing Figs.

| [52] | U.S. Cl. | 29/95 |
| [51] | Int. Cl. | B26d 1/00 |
| [50] | Field of Search | 29/95.96 |

[56] References Cited
FOREIGN PATENTS

| 1,327 | 3/1931 | Australia | 29/95 |
| 919,762 | 2/1963 | Great Britain | 29/95 |
| 40,762 | 5/1932 | France | 29/95 |
| 750,726 | 1/1945 | Germany | 29/96 |
| 828,786 | 1/1952 | Germany | 29/96 |

*Primary Examiner*—Harrison L. Hinson
*Attorney*—Freeman & Taylor

ABSTRACT: An elongated insert for metal cutoff tools of the type shown in Novkov U.S. Pat. No. 2,846,756 characterized by the presence of a thin layer of dampening material interposed beneath and behind the carbide cutting tip to improve the cutting characteristics of the same. The thin sheet of material or layer is contoured for coplanar relationship with the V-shaped bottom surface of the shank portion of the tool.

PATENTED APR 27 1971 3,576,060
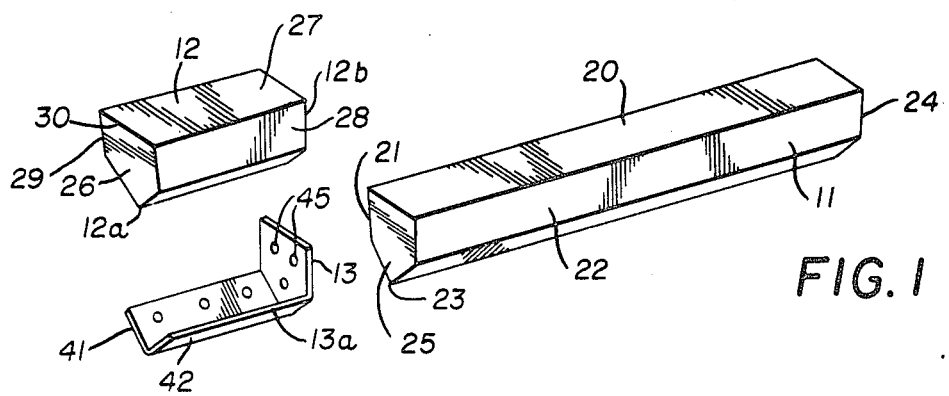
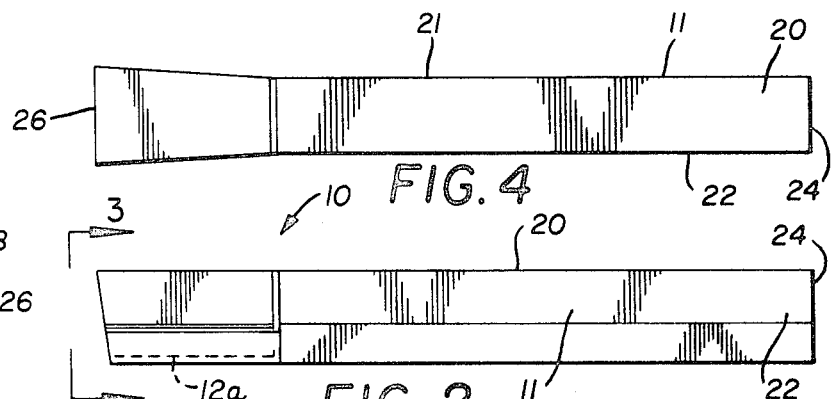
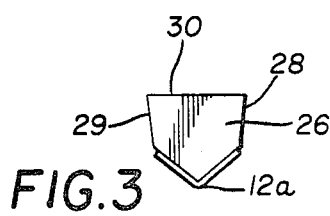
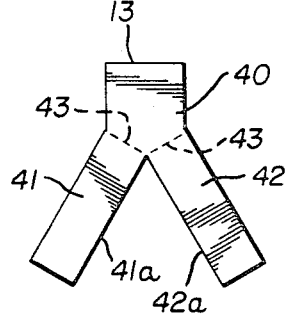
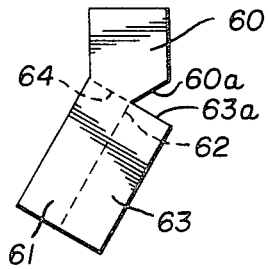
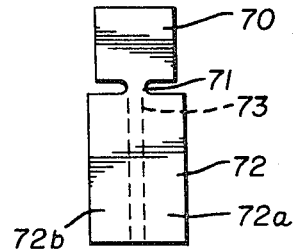
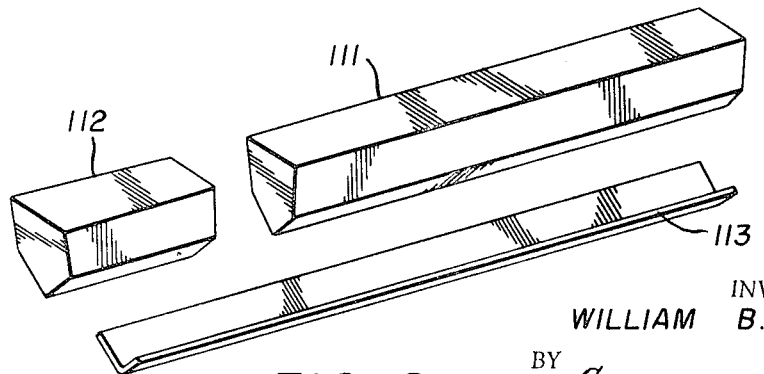
INVENTOR.
WILLIAM B. STEIN
BY Freeman + Taylor
ATTORNEYS 3,576,060

INSERT BIT HAVING VIBRATION-DAMPENING PROPERTIES

BACKGROUND OF THE INVENTION

1. Field Of Invention

In the art of metal cutoff it has long been known that tremendous forces are encountered because of the fact that the entire width of the tool is cutting the groove in question so as to place the tool under extreme forces that are generally applied downwardly and tend to break the same if not properly supported.

In applicant's earlier patents mentioned below there was disclosed an insert type of tool that had an elongated "bitlike" configuration and that had its bottom surface contoured in a V-shape for coacting support on a complementally contoured upper edge of a support blade with the combination of bit and blade serving to provide sufficient strength to withstand the forces encountered during the cutoff operation.

It has also been established that carbide, being relatively hard by nature, is difficult to rigidly support and since the rigidity of the tool during cutoff is a factor of the success achieved it is apparent that increased cutoff efficiency can be attained by producing a cutoff tool that can be supported with increased efficiency.

2. The Prior Art

The most pertinent prior art known can be found in applicant's earlier U.S. Pat. Nos. 2,845,756 and 2,964,833 which disclose an elongate, pencillike cutting insert with a coextensive carbide cutting tip secured to one end of the shank by brazing or similar means.

SUMMARY OF THE INVENTION

Applicant has discovered that if the basic characteristics of the insert shown in the aforementioned patents are altered to provide a thin layer of steel beneath and behind the carbide tip that an improved cutoff operation will be obtained by such a tool in view of the increased rigidity that can be achieved with respect to holding the same during periods of cutoff.

Essentially this increased rigidity results from the fact that the steel is able to more properly adapt to a seated relationship with the support blade. Additionally the steel, being considerably softer in nature than the carbide tip, is able to serve as a vibration-dampening medium for the carbide which would otherwise be subject to chattering or other similar unsatisfactory movements.

Additionally the use of such a dampening layer has the further advantage of increasing the strength of both the shank and the tip portions of the insert since an increased area of brazing surface is provided by virtue of the fact that the intermediate or bonding layer is not only positioned between the point of juncture between the tip and shank but is further fused beneath the tip and brazed in this area so as to give a correspondingly increased strength at the point of connection between tip and shank.

Finally a construction of this type produces the further advantage of presenting an insert bit whose lower surface is made up entirely of steel with the result that grinding problems incident to the grinding of insert bits of the type set forth in the aforementioned patents are eliminated.

Production of an improved insert bit having the above characteristics accordingly becomes the principal object of this invention with other objects thereof becoming more apparent upon a reading of the following brief specification, considered and interpreted in the light of the accompanying drawings.

OF THE DRAWINGS

FIG. 1 is an exploded perspective view of the improved insert.

FIG. 2 is a side elevational view thereof.

FIG. 3 is a front elevation taken on the lines 3–3 of FIG. 2.

FIG. 4 is a top plan view.

FIGS. 5, 6 and 7 are planar outlines of various forms of layers adapted for use with the improved insert.

FIG. 8 is an exploded perspective view of a modified form of the improved insert.

DETAILED DESCRIPTION OF THE INVENTION

Referring now to the drawings and in particular to FIGS. 1 through 4 thereof, the improved insert, generally designated by the numeral 10 includes a shank portion 11, a hardened cutting tip 12 and an appropriately contoured intermediate layer member 13 with the arrangement being such that the layer unit 13 is shaped and contoured to be positioned between the tip and shank as shown in FIG. 2 with the same additionally having a forward projecting portion 13a that underlies the lower edge 12a of the tip member 12 as clearly shown in FIGS. 2 and 3.

With reference to the shank member 11, the same is preferably made of soft steel and is elongated in configuration so as to include top surface 20, opposed side surfaces 21 and 22, a V-shaped bottom surface 23 and rear and forward ends 24 and 25 respectively. In this regard the cross-sectional profile of the shank portion 11 generally corresponds to the insert member shown in the aforementioned Novkov patents.

The tip 12, also substantially conforms to the contour shown on the aforementioned Novkov patents with the exception that the same has a reduced height so that the lower surface 12a thereof is in fact offset with respect to the V-shaped bottom 23 of shank 20 with this condition being best illustrated in FIG. 2 of the drawings. The front surface 26 of the tip 12 tapers rearwardly and downwardly with respect to the cutting edge 30 so as to provide the usual front clearance required in cutoff tools of this type.

Likewise the top surface 27 of the tip 12 tapers rearwardly from the cutting edge 30 to provide back clearance while the opposed side surfaces 28 and 29 of the tip member 12 are similarly tapered as best shown in FIG. 3 to provide the requisite side clearance with respect to edge 30.

Preferably and as has been indicated above the layer unit 13 is of steel which is initially cut out in sheetlike fashion to any one of the selected planar outlines shown in FIGS. 5, 6 and 7. To assist in forming the thickness of the sheet material it is relatively thin in the nature of a few thousandths of an inch with this arrangement permitting easy forming of the planar sheet material into the appropriate contour required for support between tip and shank portions. It is of course apparent that while thicker sheet members could be used that this would only increase the difficulty of forming the same. It has been found by experiment that only a minimal thickness of sheet material is needed to impart the vibration-dampening characteristics to the tool.

Furthermore a relatively thick layer will be subjected to "mushrooming" under cutting pressure. Also, a thin layer will become "work hardened" quicker and will also resist thermal expansion better.

Turning now then to a detailed consideration of the intermediate layer 13, the same is preferably of one-piece construction selected from the various utilizable planar profiles such as are shown in FIGS. 5, 6 and 7 and in this regard with reference to FIG. 5, the same includes a base portion 40 and angularly extending shank portions 41 and 42 with dotted lines 43,43 indicating the appropriate portion for bending the unit 13 from the flat configuration of FIG. 5 to the right-angle configuration shown in FIGS. 1 through 4 of the drawings. It is of course apparent that the edges 41a and 42a could be welded together after such folding to insure a unitary configuration such as is illustrated in FIG. 1 of the drawings. It will be noted in this regard that the leg portions 41 and 42 as shown in FIG. 1 have been formed not only at right angles to the base portion 40 but also at substantially right angles to each other as clearly illustrated from FIG. 3 of the drawings. If desired holes 45,45 may be provided for the purpose of improving the efficiency of the brazing operation.

In use or operation of the improved tool it will first be assumed that the component parts have been provided in the manufactured form shown in FIG. 1. At this time it is merely necessary that the V-shaped bottom 12a of the tip be brazed in the trough formed by the leg member 41 and 42 of layer 13 with the rear wall 12b of the insert being also positioned in coplanar alignment with the base member 40 as clearly shown in FIG. 2 of the drawings. At this time a simple brazing operation may be effectuated to insure connection of these components in the manner just described.

Following assembly of the tip and layer units 12 and 13 as just described, it is apparent that this subcombination of elements may be bonded to the forward wall 25 of the shank so as to constitute the completed insert bit.

It is to be understood that if desired for any reason, that the procedure of assembly could be reversed with the unit 13 being first bonded to the shank 11 followed by bonding of the tip 12 to the subassembly of shank 11 and layer 13.

At this point it should be noted that base portion 40, as well as base portions 60 and 70, also serves to absorb the heat expansion differences between tip 12 and shank 11 during brazing.

When the tool has been assembled as just described it is merely necessary that the bottom be ground so as to establish the appropriate desired coplanar relationship between the lower surface of shank 11 and the bottom of shim unit 13. Additional grinding will normally not be necessary unless it be touchup-type grinding with respect to the top surfaces of the tip and shank.

In the modified form of the invention shown in FIG. 6 the layer is made up of a base 60 and an angularly extending projection 61 with the projection 61 having a fold line 62 that permits the portion 63 thereof to be bent to approximately a condition of 90° relationship with respect to the portion 61.

Similar bending along the dotted line 64 will result in the shaping of the layer unit to the approximate condition of FIG. 1 with brazing or other welding of surfaces 63a and 60a together producing a formed unit of the type shown in FIG. 1.

With reference to the form of the layer unit 13 shown in FIG. 7 the same generally includes a base portion 70 having a reduced neck portion 71 that is connected to the leg portion 72 with the leg portion 72 having bend lines 73,73 that permit bending of the tip portions 72a and 72b into the requisite V-shaped relationship. Following such bending it is of course apparent that the base portion 70 may be bent at right angles to form a properly shaped layer unit that corresponds substantially to the unit 13 as shown in FIG. 1.

FIG. 8 shows a modified form of the invention wherein a conventional shank and tip 111,112 are provided and wherein layer 113 is dimensioned so as to underlie the entire length of the shank and tip.

While a full and complete description of the invention has been set forth in accordance with the dictates of the patent statutes, it is to be understood that the invention is not intended to be limited to the specific embodiment herein shown. Accordingly, modifications of the invention may be resorted to without departing from the spirit hereof or the scope of the appended claims.

I claim:
1. A cutoff insert, comprising:
   A. an elongate shank having a contoured bottom edge, opposed side surfaces and a top surface;
   B. a hardened cutting element adapted to be mounted in projecting, coextensive relationship from one end of said shank and having a similarly contoured bottom edge;
   C. a metallic sheet contoured complementally with the bottom surfaces of said shank and said cutting element and adapted to underlie the bottom surface of said cutting element;
   D. said metallic sheet including a base portion adapted to be disposed in coplanar relationship with the forward end of said shank and further including a contoured support surface projecting at right angles to said base portion and forwardly of said shank with said support surfaces of said sheet and said shank being in coplanar relationship.

2. The device of claim 1 further characterized by the fact that said sheet has, in its flat condition, a unitary base and a shank portion divided into two equal extending parts that are adapted to be fastened together and deformed so as to project at substantially right angles from said base and conform to the bottom surface of said cutting element.

3. The device of claim 1 further characterized by the fact that said sheet has, in its flat condition, a unitary base and an angularly extending unitary shank; with said shank being adapted to be deformed to conform to the contour of the bottom surface of said cutting element and further to be deformed so as to project at substantially right angles from said base.

4. The device of claim 1 further characterized by the fact that said sheet has, in its flat condition, a unitary base and a projecting shank; said base and shank being connected by a reduced width portion with said shank portion being adapted to be deformed to the contour of the bottom surface of said cutting element and further to be deformed so as to project at substantially right angles from said base.